Sept. 28, 1948.　　　　　J. R. HOLICER　　　　　2,450,142
SLIP TUBE GAUGE FOR LIQUEFIED PETROLEUM GAS TANKS
Filed Sept. 2, 1943
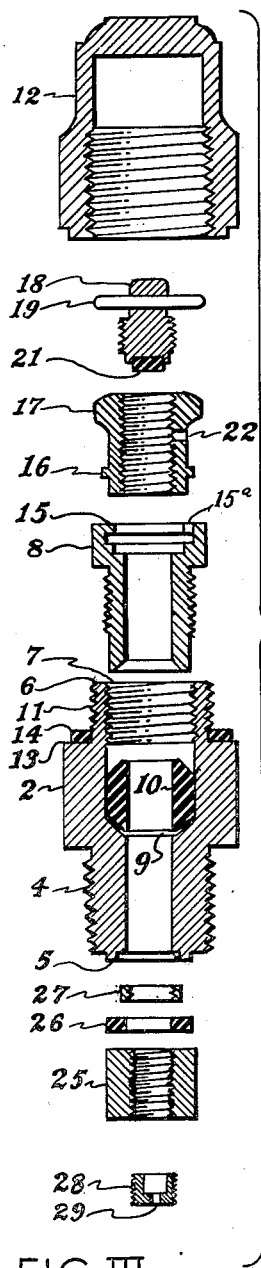
FIG. III
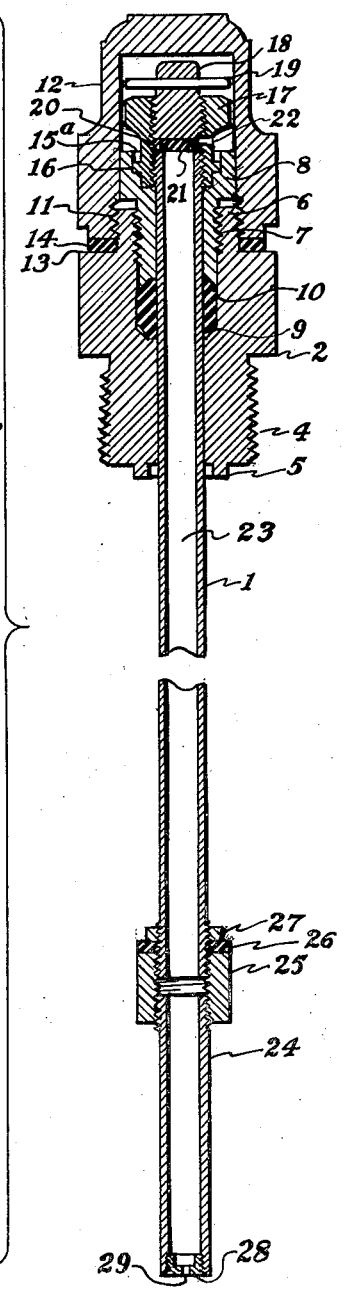
FIG. II
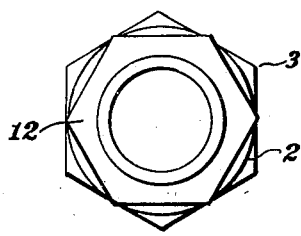
FIG. I
John R. Holicer
INVENTOR.

Patented Sept. 28, 1948

2,450,142

UNITED STATES PATENT OFFICE 2,450,142

SLIP TUBE GAUGE FOR LIQUEFIED PETROLEUM GAS TANKS

John R. Holicer, Shreveport, La.

Application September 2, 1943, Serial No. 501,022

1 Claim. (Cl. 73—298)

This invention has to do with a device for indicating the level of liquid in a pressure vessel, and for determining the gas-filled space above such liquid, commonly called outage space. It is particularly useful in determining the quantum and character of the contents of a tank containing liquefied petroleum gas fuels, such as butane and the like.

Various have been the devices employed for measuring butane in tanks; but because of the extreme volatile character of such fuel, and particularly because of its inflammable nature and explosiveness, great care is required to be exercised in handling it and in measuring and examining it.

Gages have been used which are unsafe, delicate and easily damaged. For example, the magnetic float type gage is such a device. The float may leak, the gears become inaccurate, and foreign materials cause the magnetic needle to stick, especially if the glass cover is broken.

Another gage which gave trouble and frequently leaked is the old-fashioned slip-tube gage; and as heretofore constructed it discharged too much fluid from the tank while it was being read; and there was no way to prevent occasional or continued leaks around the slip-tube itself, even though packing was used. This gage did not answer the need for safety, so ever present in the handling and gaging of liquefied petroleum gases.

Usually the entire length of the slip-tube was allowed to extend above and outside the tank; and its expulsion from the tank entirely by reason of the considerable gas pressure maintained in butane storage tanks was prevented only by a simple collar threaded onto the extreme end of the pipe or tube; and this collar was never locked in place and frequently it became loose and fell off. Then the tube itself would be expelled entirely from the tank, leaving an open hole through which the explosive fluid would be discharged to the atmosphere, causing fires and great damage to property, with occasional loss of life.

Another difficulty with the older gages was that no provision was made for automatically determining, measuring and limiting the outage space so that it would not be filled with liquid. This resulted occasionally in overfilling of the tank, with attendant fire hazards.

One undesirable result of a completely filled tank was that when the liquid expanded it would be forced through the service line to the consuming appliances and cause the premises to catch fire. The cook stoves, water heaters and all gas burners would be filled with liquid fuel which would explode when ignited.

It is extremely desirable that a dependable and very safe gage be provided in the handling of these fuels; and it is further desirable that provision be made for the automatic determination of the outage space, so that the operator would not fill it with liquid fuel.

A primary object of this invention is the provision of a slip-tube gage which will provide the maximum of safety and dependability.

A further object is the provision of a gage which is exactly accurate in all of its readings, in that it will determine the level of fuel at the most minute differences in levels of the liquid in the tank.

A further object is to provide a device for securely closing and locking the gage in place, when not in use.

An important object is to furnish a secondary and positive seal against fluid passing around the slip-tube and through the fittings which carry it, while the gage is being read.

A valued object is to provide this effective secondary seal so that while it is in use the head of the gage can be removed, the packing nut unscrewed and new packing placed around the tube in the gage head without any possibility of a leak around the tube during this operation of repacking, or while parts of the head are being repaired or removed for cleaning.

A further object is to provide a stop ring with a lock nut thereon, so that the stop ring cannot work loose or come off of the lower part of the slip-tube.

A further object is to provide means for automatically measuring and indicating the outage space desired to be left unfilled with liquid.

And a still further object is to provide, in a slip-tube sufficiently large to be cleaned and in which accumulations of foreign matters may be prevented to a considerable degree, a minute safety orifice at the extreme lower end of the tube, so that far less than the usual quantity of liquid or gas will pass therethrough and along the channel of the tube and out to the atmosphere.

A still further object is the provision of the minute safety orifice at the lowest end of the tube so that only an extremely small quantity of fluid could pass out of the gage to the atmosphere even though the entire head of the gage exposed above the tank were completely broken off.

In the drawings:

Fig. I is a plan view looking down at the gage head from above.

Fig. II is a sectionalized elevation of the entire gage assembly.

Fig. III is a sectionalized elevation of all of the parts of the gage, severally and in order, except only that the tube itself is not shown in this figure.

The drawings and the specification set forth a preferred form of this invention; but modifications in structure and arrangement and relation of the parts of this gage may be made without departing from the spirit of this invention and still effect its objects.

In the drawings the parts and details of the gage structure are referred to by numerals, in which numeral 1 is a small straight tube, sufficiently long to pass through the top of the tank in which it is carried and the fittings thereabove, and extend almost to the bottom of the tank.

The tube is carried by gage head 2 which is removably mounted in a threaded opening in the top of the tank containing fluid under pressure.

This head is provided with hexagonal shoulders 3, spaced intermediate its ends; and the lower end of the head below the shoulders is provided with threads 4 for screwing it into suitable opening in the tank.

The extreme lower end of the head is provided with a ring extension thereof having a smooth finished lower face 5. This extension is adapted to provide a valve seat, the use and operation of which will presently be described. Above the shoulders on the head is an upper extension 6 of the body threaded both inside and outside.

The inside thread 7 is made to carry a compression nut 8. This nut extends part way down into a packing well or space 9, filled with packing 10. The side walls of the well are not threaded; and the lower extremity of packing nut 8 is finished in a concave form, the better to engage and compress the packing against the side wall of tube 1.

The outside threads 11 of the topmost extension of the head 2 are designed to carry sealing cap 12, which has a lower finished face. Underneath this face and resting on the shoulder 13 of member 2 there is a ring of packing 14, provided so that when the cap is screwed down fast it seals the head against the possibility of any escape to the atmosphere of any fluid as may appear therein, such as might be present if packing 10 were to leak.

The upper part of packing nut 8 is turned inwardly to form a rim 15, having therein one or more slots 15a, so that dogs 16 carried by tube head 17 may be pressed downwardly through these slots and turned slightly to be engaged by the over-hanging rim 15, and thus lock the tube in place so that it cannot slip upwardly through the gage head 2.

The upper end of tube 1 is threaded externally so that it will cary the tube head 17. This tube head is threaded internally through the entire length of its vertical opening; and the upper part of the opening is made to carry screw valve 18. This valve has a pin 19 extending transversely through its body to form a handle for turning the valve.

The upper end of tube 1 is smoothly finished and slightly beveled on its inside wall and on its outside wall to form a valve seat 20.

The screw valve 18 carries a valve disc 21 at its lower end; and this disc is made to be firmly engaged on valve seat 20, so that when the valve is screwed down in place the tube 1 is completely sealed at its upper end.

Immediately above the seat of valve 18 there is provided through the side wall of tube head 17 a discharge hole 22, through which the contents of the tank will discharge to the atmosphere while the gage is being read.

In order to effect reading of the gage it is necessary to remove cap 12, and slightly rotate tube head 17 to disengage dogs 16 from underneath rim 15; and this will allow the tube to slip upward through gage head 2 which carries it. Screw valve 18 is rotated and unscrewed until hole 22 is exposed and allowed to communicate with the channel 23 in tube 1.

Tube 1 has a tubular extension 24. It is provided to effect the determination of the outage space in the tank. It is used to measure the depth of this outage space which is left in the tank for the accumulation of gases expanded from the liquid fuel. The space thus left is usually ten per cent of the maximum capacity of the tank. The remaining ninety per cent of the tank is filled with liquid fuel, when the tank is recharged or serviced; and this ninety per cent left represents the maximum liquid capacity of the tank. It is highly important that liquid be not introduced into the tank in an amount exceeding this pre-determined maximum liquid level of ninety per cent.

The character of the fuel determines the relative percentage of the outage space and liquid space. For instance if straight propane were used a greater gas space and a less liquid space would be provided for. Butane, the most commonly used of these somewhat similar fuels, is usually handled by allowing the relation of ninety per cent for liquid and ten per cent for gas. Of course the length of slip-tube 1 and the length of outage tube 24 can be made and measured to accommodate the requirements of the particular fuel with which this gage is to be used.

The lower end of slip-tube 1 is threaded externally; and there is screwed thereon the stop ring 25, the upper circular surface of which is smoothly finished to receive and carry gasket 26. In order that this gasket may not become disassociated from the stop ring 25 on which it normally rests, and in order that the stop ring itself may not become disengaged from the slip-tube, there is provided a threaded lock nut 27 immediately above the packing. When this nut is firmly made up it will also hold the packing in place.

It is to be recognized that this is a slip tube gage; and because the tube is required to slide up and down in its housing there would ordinarily be opportunity for leaks around the tube. The liquefied petroleum gases stored in the tank which carries this gage are quite volatile and usually exert considerable pressure. When the tube is the least bit loose in its housing this fuel undertakes to escape around the outside of the tube, either as a gas or as liquid. This usually occurs when the cap 12 has been removed from the gage and when valve 18 has been opened and when the tube is elevated in its housing to gage the contents of the tank, as when the tank is being refilled with fuel. Therefore, valve seat 5 has been arranged as an extension of the gage head 2; and the stop ring 25 has been smoothly surfaced on its upper face and provided with gasket material 26 which will co-act with valve seat 5 to constitute and to close a valve when the tube is elevated in the housing. Since considerable pressure is exerted against the tube by reason of gases within the tank, this cushion-like material 26 is kept firmly against valve seat 5 whenever the tube is unlocked and allowed to be elevated by the pressure in the tank. Thus a positive valve closure is effected which will prevent the escape of fluid around the tube while the tank is being gaged.

Outage tube 24 is threaded on its upper external wall and is carried by stop ring 25 from which it depends; and it is locked in place, as explained next.

Although in Fig. II there is shown, solely for the purpose of clarity, a space between the opposed ends of tube 1 and tube 24, it is to be noted that stop ring 25 is threaded internally throughout its length. This is done so that both of these tubes can be firmly screwed up into immediate contact with one another. To so make them up will further help to lock them both sufficiently and securely into stop ring 25, and prevent their accidental disengagement.

The lower end of outage tube 24 carries an internal thread into which is fitted safety plug 28 which has a minute hole therethrough known as a safety orifice 29.

The purpose of this arrangement of a safety plug is to allow the construction of the slip-tube with a channel 23 sufficiently large to prevent stoppage thereof by the accumulation of foreign matter therein. And this channel is also made sufficiently large to allow the occasional cleaning thereof with a rod and swab. Because of these considerations the old style gage has always carried a somewhat larger channel than is required for reading and determining the contents of the tank.

Only an extremely minute quantity of fluid, either liquid or gaseous, need be discharged to the atmosphere through opening 22 for the operator to determine its character and to properly read and know the level at which the liquid has arisen in the tank while it is being filled, or to measure the level to which it has fallen from use.

Therefore this safety plug 28 with its extremely small aperture or orifice 29, has been provided in the lowest extremity of the gage. Through this orifice there will come just sufficient fluid to allow accurate reading of the gage. However, there will not be discharged to the atmosphere sufficient fluid to constitute a hazard; and this is a matter of great importance.

It is to be observed that if the operator inadvertently left open screw valve 18 and allowed the gage to remain in extended position there would not be enough fluid discharged through orifice 29, and eventually to the atmosphere through opening 22, to constitute a danger of any moment.

Even if the top of the gage, and all its fittings above the gage head 2, were broken off, no very appreciable quantity of fluid would escape. The quantity that would be discharged through orifice 29 would be noticeable but not dangerous. An operator could see it; but the break or inadvertence could be corrected before any damage at all could result or would result. Even if the discharge from opening 22 were ignited, the flame would be so extremely small that it could be smothered with one's hand without any injury to the person. These matters of safety are highly important.

It is to be noted that the stop ring 25 is so constructed and arranged that the gasket 26, which is supported on the upper face of the ring, will in fact press against, impinge and contact the annular projection 5 on the lower face of housing 4, so that, when the slip tube is extended upwardly to its most elevated position, this gasket in cooperation with projection 5 will seal the tank or container in which this slip tube gage is inserted to effectively prevent the escape of any fluid upwardly and around about the slip tube itself. This construction is designed to afford and constitute a valve disposed outside of tube 1. The valve seat is provided by member 4, and especially by its projection 5, which works cooperatively with stop ring 25, and especially its gasket 26. Ring and gasket together function as a valve head. This valve seat and this valve head work in related fashion to provide a valve in fact. Lock nut 27 prevents the gasket from leaving its position on the stop ring and from working loosely along tube 1 and from failing to separate from projection 5 when the slip tube is returned to its deepest penetration within the tank. This lock nut does not interfere with contact between the gasket and projection 5. In fact the lock nut is designed to fit up within the projection so that the gasket fully contacts the latter.

The operation of this gage should be self-evident from the disclosures of this specification and the drawings. However to make the matter more clear, the operation is briefly outlined as follows:

The combination safety slip-tube and outage gage is ordinarily kept in closed, sealed and locked position, with its extremity above the tank capped.

Reading is done at infrequent intervals to determine if the tank needs to be refilled with fuel. When the tank is being charged with fuel there is a frequent, if not almost continuous reading of the gage. If the customer desires less than the full charge of a tank of fuel, the predetermined level to which the liquid is to be supplied may be ascertained by consulting a previously prepared chart which reveals the contents of the tank, inch by inch, and for fractional parts of an inch. The tank is then filled to the required level which will indicate the gallonage delivered. By hand the operator slides the gage up or down in the gage head until the lower part of the gage is held at the required level. Then he watches the discharge hole at the top of the gage until a thin stream of liquid appears, at which moment he cuts off the pump delivering fuel to the storage tank.

More often the tank is charged to its maximum liquid capacity (which is usually ninety per cent of the entire tank capacity). When this is to be done the operator simply uncaps the gage, unlocks the gage head by releasing the dogs, opens the screw valve at the top of the gage and then he allows the gage tube to slip upward through its housing. Pressure within the tank will force the upward extension of the tube to the fullest extent possible.

When in fully extended position the gage stands so that it will discharge a very fine stream of gas through the opening to the atmosphere until the liquid has reached and entered the safety orifice at the extreme bottom of the gage. Then a tiny stream of liquid will appear and be discharged from the top of the gage. At that moment the filling of the tank to the proper liquid level is complete. Then the operator cuts off the pump and closes the filling opening in the tank. Immediately thereupon he restores the gage to its collapsed, closed, sealed and locked position.

The necessity and advantage of providing an automatic indicator and measure for leaving the gas outage space unfilled with liquid should be as obvious as it is important; and in any event this improved gage certainly effects this desirable object.

This gage then is offered as one of extreme safety and accuracy. It is leak proof and allows cleaning and repacking of its exposed parts and mechanism while the storage tank is in operation. It insures leaving an outage space for purposes of safety; and it does this automatically.

It prevents fires, explosions and wastage; and it still contiuues to be a safe gage if its top-most parts are broken off. It continues to be safe even though these parts are broken off while the gage is fully extended. It is extremely dependable. The need for safety and accuracy has caused its creation.

I claim:

In a gage for liquefied petroleum gas tanks, a mounting adapted to carry a slidable tube; a tube movable through the mounting; a removable valve constructed to normally close the tube at its top and arranged to be partially opened to allow communication between the tube and an observation discharge port in the valve housing, the valve being constructed to be further opened to allow communication between the tube and the atmosphere through an opening as large as the diameter of the tube; a housing for the valve provided with a projection from its outer wall; a receptacle for the valve housing carried by the tube mounting and provided with means for engaging the projection when the housing is partially rotated in the receptacle, such engagement being reversible and arranged to hold the gage tube in its lowest normal position when the gage is not being operated to determine the contents of the tank; and a plug carried in the lower end of the tube and provided with a restricted orifice to afford constant communication between the tube and the tank and constructed to limit the volume of fluid discharged through the tube when the tube is fully opened at its upper end.

JOHN R. HOLICER.

REFERENCES CITED

The following references are of record in the file of this patent:

UNITED STATES PATENTS

| Number | Name | Date |
|---|---|---|
| 1,669,776 | Osburn | May 15, 1928 |
| 1,739,711 | Crell | Dec. 17, 1929 |
| 2,121,673 | White | June 21, 1938 |
| 2,186,924 | Hopper et al. | June 9, 1940 |
| 2,214,713 | White | Sept. 10, 1940 |
| 2,215,594 | Parsons | Sept. 24, 1940 |
| 2,303,712 | Sundstrom | Dec. 1, 1942 |
| 2,307,263 | Griffith | Jan. 5, 1943 |
| 2,320,731 | Hooper et al. | June 1, 1943 |
| 2,322,660 | Parsons | June 22, 1943 |